United States Patent
Yamada et al.

(10) Patent No.: US 12,061,667 B2
(45) Date of Patent: Aug. 13, 2024

(54) DATA PROCESSING METHOD

(71) Applicants: TOYOTA JIDOSHA KABUSHIKI KAISHA, Toyota (JP); DENSO CORPORATION, Kariya (JP)

(72) Inventors: Takafumi Yamada, Okazaki (JP); Hiroyuki Akuzawa, Kariya (JP); Noboru Kitahara, Kariya (JP); Taichi Watanabe, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 88 days.

(21) Appl. No.: 17/579,961

(22) Filed: Jan. 20, 2022

(65) Prior Publication Data
US 2022/0309129 A1   Sep. 29, 2022

(30) Foreign Application Priority Data
Mar. 25, 2021   (JP) .................................. 2021-051502

(51) Int. Cl.
*G06F 17/18*   (2006.01)
*G01M 15/04*   (2006.01)

(52) U.S. Cl.
CPC ........... *G06F 17/18* (2013.01); *G01M 15/042* (2013.01)

(58) Field of Classification Search
CPC .............................. G01M 15/042; G06F 17/18
See application file for complete search history.

(56) References Cited

U.S. PATENT DOCUMENTS

2006/0224298 A1 * 10/2006 Lang ........................ G01F 1/72
701/115

FOREIGN PATENT DOCUMENTS

| JP | 2013142292 A | * | 7/2013 |
|----|--------------|---|--------|
| JP | 2018-047890 A | | 3/2018 |
| JP | 2018-159369 A | | 10/2018 |

* cited by examiner

*Primary Examiner* — Kevin A Lathers
(74) *Attorney, Agent, or Firm* — Oblon, McClelland, Maier & Neustadt, L.L.P.

(57) ABSTRACT

A data processing method is a data processing method in which variable measurement data transmitted from a sensor at a first cycle is computationally processed at a second cycle that is longer than the first cycle. The measurement data is acquired in a third cycle that is longer than the first cycle and shorter than the second cycle, an average value of the acquired measurement data is calculated at the second cycle, and computation processing thereof is performed.

20 Claims, 12 Drawing Sheets

DATA PROCESSING METHOD

CROSS-REFERENCE TO RELATED APPLICATION

This application claims priority to Japanese Patent Application No. 2021-051502 filed on Mar. 25, 2021, incorporated herein by reference in its entire.

BACKGROUND

1. Technical Field

The disclosure relates to a data processing method.

2. Description of Related Art

With regard to control of an internal combustion engine such as a gasoline engine, for example, an electronic control unit (ECU) acquires measurement data regarding intake air volume from an air flow meter by Single Edge Nibble Transmission (SENT) communication as an example, and executes computation processing relating to control of an amount of fuel to be injected by a fuel injection valve (e.g., Japanese Unexamined Patent Application Publication No. 2018-159369 (JP 2018-159369 A)). Note that measurement data may be transmitted from a pressure sensor to the ECU.

SUMMARY

The ECU executes data processing at a cycle longer than the data transmission cycle of the air flow meter, in order to suppress the load of computation processing. Accordingly, the timing at which the ECU acquires the data and performs computation processing is delayed regarding the data transmission timing, and the delay time thereof fluctuates cyclically.

Further, in an internal combustion engine, intake pulsation is generated in an intake pipe, due to reciprocating motion of pistons and opening/closing operations of intake valves. Accordingly, the measurement data value transmitted from the air flow meter also fluctuates in accordance with the intake pulsation. Due to the cyclic fluctuation of the cycle of intake pulsation and the delay time of data processing, error occurs in the measurement data values acquired by the ECU, and a swell phenomenon occurs in which the numerical value obtained by the computation processing fluctuates in short cycles.

Thus, the precision of the computation processing may deteriorate, and control may be affected. On the other hand, shortening the processing cycle of the ECU can reduce the delay time and the swell phenomenon can be suppressed, but the load of computation processing increases, and accordingly a high-performance ECU is required and costs increase. Such problems are not limited to the intake air volume of the internal combustion engine, and also exist with regard to other variable data such as described above.

The disclosure has been made in view of the above problems, and provides a data processing method capable of improving precision of computation processing while suppressing the load of computation processing of variable measurement data.

An aspect of the disclosure relates to a data processing method in which variable measurement data transmitted from a sensor at a first cycle is computationally processed at a second cycle that is longer than the first cycle. The data processing method is a method in which the measurement data is acquired in a third cycle that is longer than the first cycle and shorter than the second cycle, an average value of the acquired measurement data is calculated at the second cycle, and computation processing thereof is performed.

In the data processing method of the above aspect, the average value of the measurement data may be obtained by adding and bit-shifting of the measurement data.

In the data processing method of the above aspect, the measurement data may indicate an operating state of an internal combustion engine.

In the data processing method with configuration described above, the measurement data may be a data regarding an intake air volume of the internal combustion engine.

In the data processing method of the above aspect, the data processing method may be used for comprehending a swell phenomenon of a pulsation frequency generated by rotation of the engine.

According to the data processing method of the disclosure, precision of computation processing can be improved while suppressing the load of computation processing of variable measurement data.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
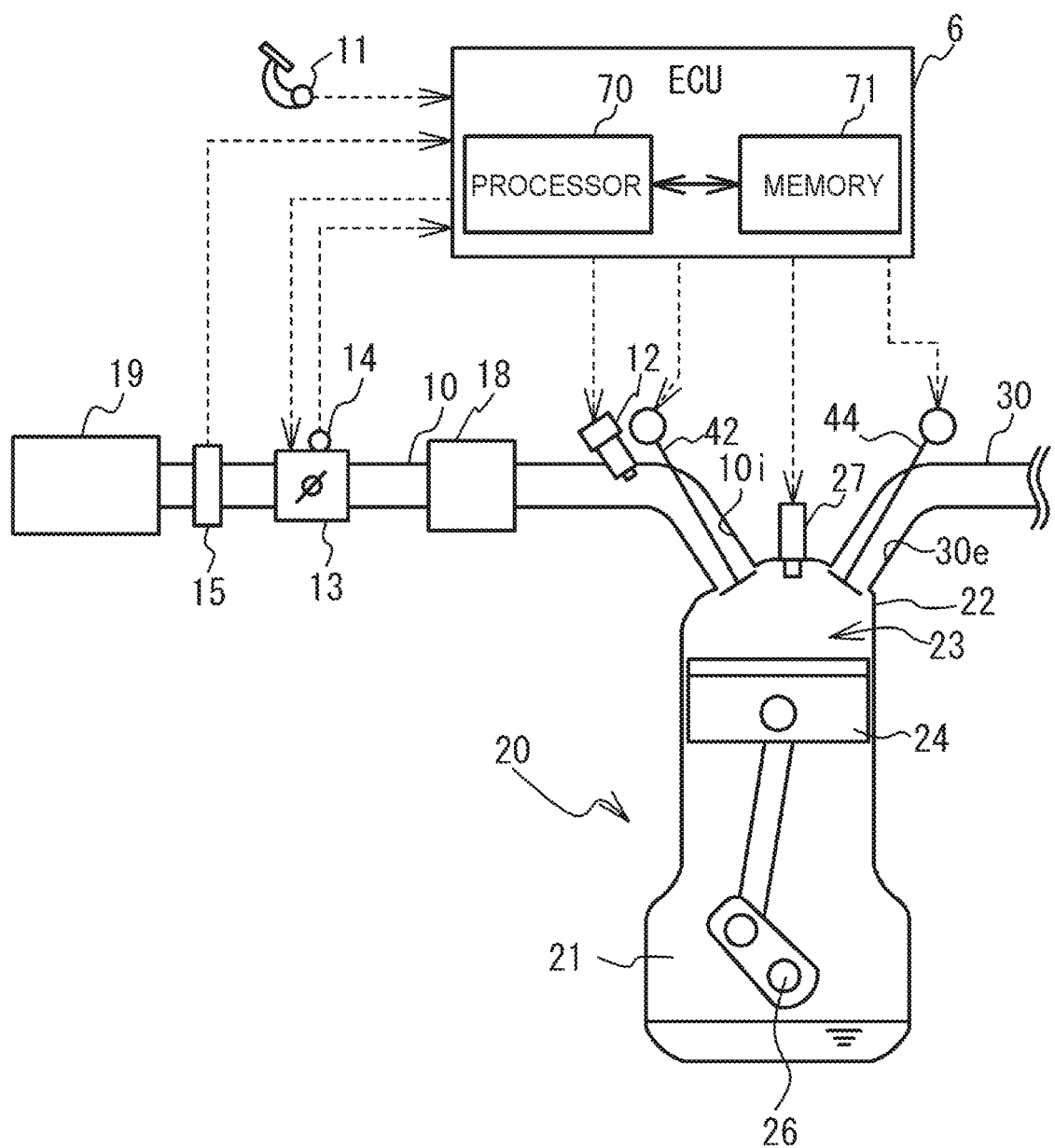
FIG. 1 is a configuration diagram illustrating an intake system of a gasoline engine to which a data processing method according to an embodiment of the disclosure is applied.

First, a configuration example of an intake system of a gasoline engine, to which the data processing method of an embodiment of the disclosure is applied, will be described. FIG. 1 is a configuration diagram illustrating the intake system of the gasoline engine (hereinafter referred to as "engine") 20. The engine 20 is an example of an internal combustion engine, but the engine 20 is not limited to this, and a diesel engine may be used instead of the engine 20. The engine 20 causes reciprocating motion of a piston 24, by combustion of an air-fuel mixture in a combustion chamber 23 in a cylinder head 22 installed on a cylinder block 21 in which the piston 24 is housed. The reciprocating motion of the piston 24 is converted into rotational motion of a crankshaft 26. Note that an example of the engine 20 includes an in-line 4-cylinder engine having four cylinders, but is not limited thereto.

The cylinder head 22 of the engine 20 is provided with an intake valve 42 for opening and closing an intake port 10i, and an exhaust valve 44 for opening and closing an exhaust port 30e, for each cylinder. Further, a spark plug 27 for igniting the air-fuel mixture in the combustion chamber 23 is attached to the top of the cylinder head 22 in each cylinder.

The intake port 10i of each cylinder is connected to a surge tank 18 via a branch pipe of each cylinder. An intake pipe 10 is connected to an upstream side of the surge tank 18, and an air cleaner 19 is provided at an upstream end of the intake pipe 10. The intake pipe 10 is provided with an air flow meter 15 for detecting the intake air volume, and an electronically controlled throttle valve 13, in that order from the upstream side.

Further, a fuel injection valve 12 for injecting fuel into the intake port 10i is installed in the intake port 10i of each cylinder. The fuel injected from the fuel injection valve 12 is mixed with the intake air to generate the air-fuel mixture. Combustion of the air-fuel mixture is performed by the air-fuel mixture being taken into the combustion chamber 23 when the intake valve 42 is open, being compressed by the piston 24, and being ignited by the spark plug 27. The air-fuel mixture following combustion is discharged to an exhaust pipe 30 by the piston 24, through the exhaust port 30e of each cylinder.

An ECU 6 includes a processor 70, such as a central processing unit (CPU) and memory 71 such as random-access memory (RANI) and read-only memory (ROM). The processor 70 reads and executes programs stored in the memory 71. Thus, the ECU 6 controls the engine 20. Note that the ECU 6 may use hardware (circuits) such as a field-programmable gate array (FPGA) and an application specified integrated circuit (ASIC) for controlling the engine 20, for example, instead of or in conjunction with the software of the processor 70.

The ECU 6 is electrically connected to the spark plug 27, the throttle valve 13, the fuel injection valve 12, and various types of sensors such as the air flow meter 15 and a throttle valve opening degree sensor 14. The throttle valve opening degree sensor 14 detects the throttle valve opening degree. The ECU 6 controls the spark plug 27, the throttle valve 13, the fuel injection valve 12, and so forth, so as to control the ignition timing, the fuel injection amount, the fuel injection timing, the throttle valve opening degree, and the like, so that a desired output can be obtained based on the detection values of the various types of sensors and so forth.

For example, the ECU 6 controls the amount of fuel injected by the fuel injection valve 12 by computation processing of the measurement data regarding the intake air volume, transmitted from the air flow meter 15. The ECU 6 generates data in accordance with the fuel injection amount from the measurement data, and outputs the data to the fuel injection valve 12.

The air flow meter 15 is an example of a sensor, with measurement data being transmitted as digital signals to the ECU 6 by SENT communication, as an example. Examples of the measurement data regarding the intake air volume include a voltage value corresponding to the intake air volume, but is not limited thereto, and the measurement data may be other variable data. Note that a pressure sensor may be used instead of the air flow meter 15. In this case, the ECU 6 performs computation processing of pressure values transmitted from the pressure sensor.

Figure 2:
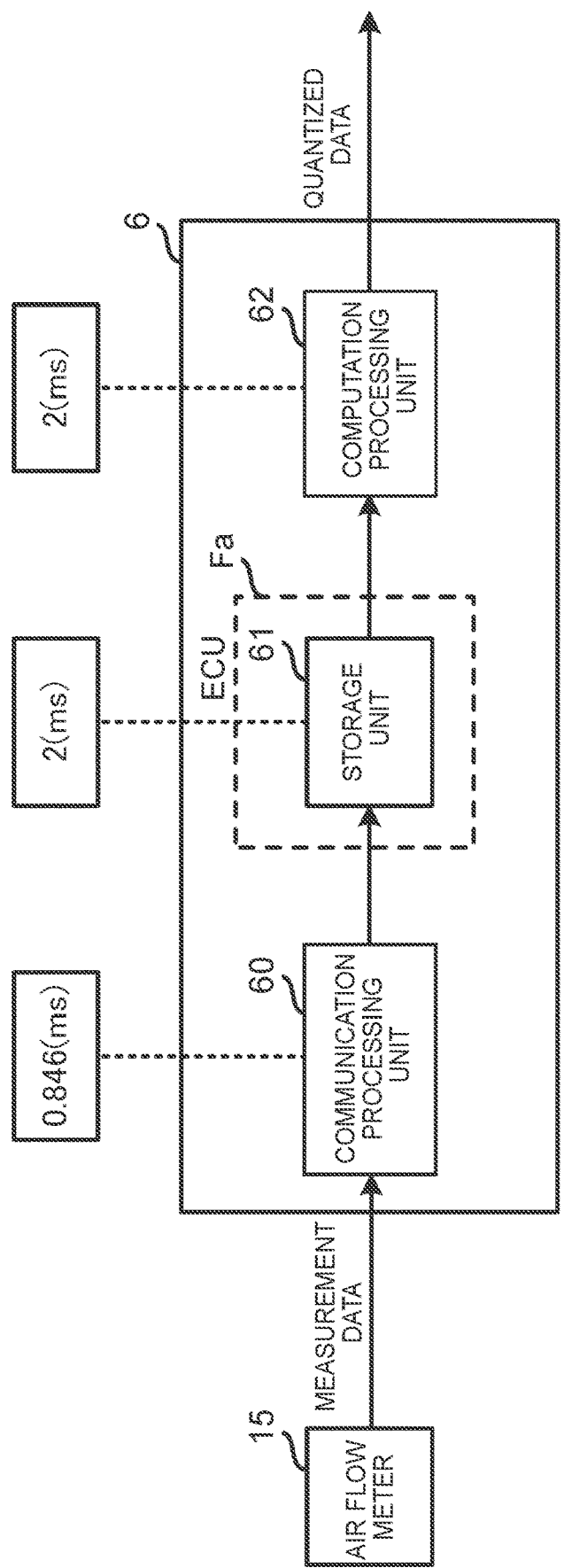
FIG. 2 is a diagram illustrating data processing of an ECU according to a comparative example of the data processing method.

Next, a data processing method according to a comparative example of the above embodiment will be described. FIG. 2 is a diagram illustrating data processing of the ECU 6 according to the comparative example. The air flow meter 15 transmits measurement data to the ECU 6 at a transmission cycle of 0.846 ms, as an example. The transmission cycle of the measurement data here is an example of a first cycle.

The ECU 6 forms a communication processing unit 60, a storage unit 61, and a computation processing unit 62 as functions, by the processor 70 reading and executing a program. Note that at least one of the communication processing unit 60, the storage unit 61, and the computation processing unit 62 may be formed by a circuit such as an FPGA.

The communication processing unit 60 receives measurement data from the air flow meter 15 by SENT communication. The communication processing unit 60 receives and holds the measurement data from the air flow meter 15.

The storage unit 61 acquires measurement data from the communication processing unit 60 at an acquisition cycle of 2 ms, as an example. The storage unit 61 temporarily stores the measurement data acquired from the communication processing unit 60 in the memory 71, for example. Note that reference sign Fa denotes a portion that differs from the embodiment described later.

As an example, the computation processing unit 62 performs computation processing of the measurement data in a processing cycle of 2 ms. The processing cycle of the measurement data is an example of a second cycle that is longer than the transmission cycle. As an example of computation processing, the computation processing unit 62 calculates a running average value of the values of the measurement data and further performs averaging thereof for each stroke of the engine 20. The computation processing unit 62 outputs step-wise quantized data in which values of computation results are held for each computation period. Based on the quantized data, pulse signals are generated according to transient response characteristics of the engine 20 from the average values of each stroke, the throttle valve opening degree, and so forth. Pulse signals are signals indicating a time breadth corresponding to the fuel injection amount, and are output to the fuel injection valve 12.

Figure 3:
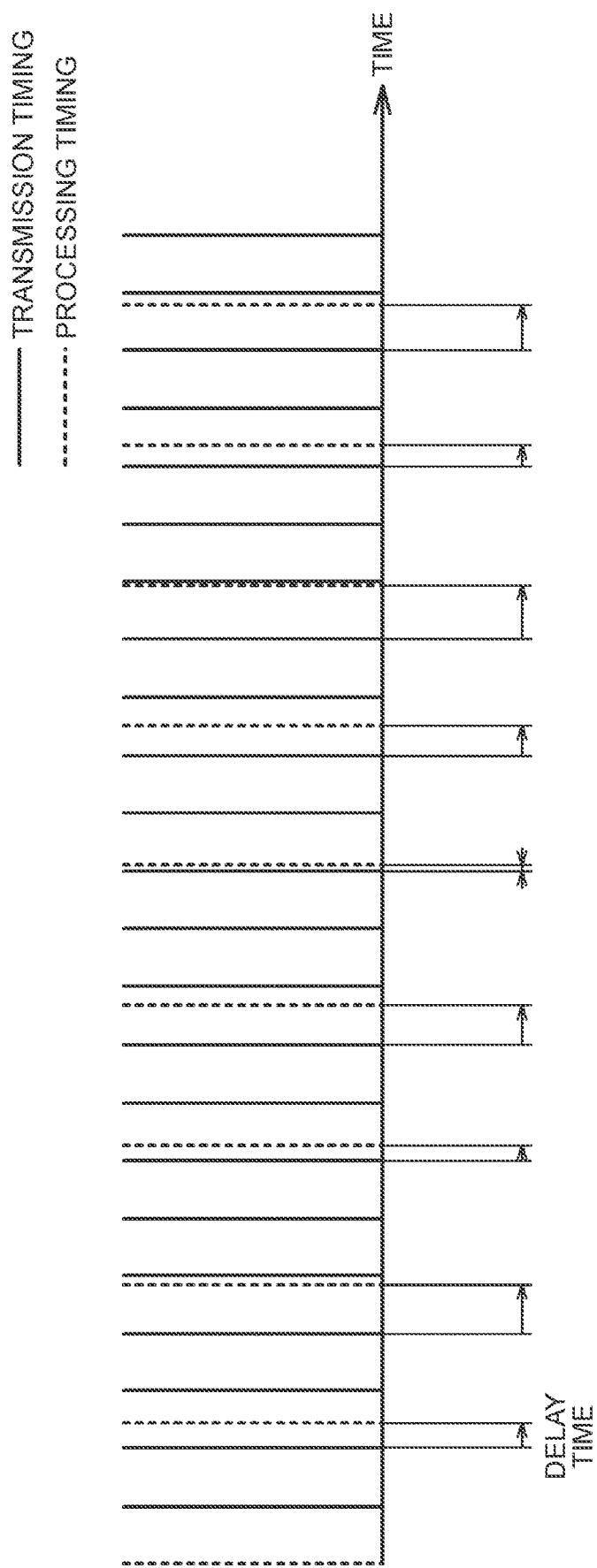
FIG. 3 is a timing chart showing an example of transmission timing and processing timing of measurement data.

FIG. 3 is a timing chart showing an example of transmission timing and processing timing of measurement data. In FIG. 3, the horizontal axis represents time, the continuous line represents the transmission timing at which the air flow meter 15 transmits the measurement data, and the dotted line indicates the processing timing at which the computation processing unit 62 performs computation processing of the measurement data.

In order to suppress the load of computation processing, the processing cycle of the computation processing unit 62 is longer than the transmission cycle of the air flow meter 15, and is not an integral multiple of the transmission cycle of the air flow meter 15. Accordingly, the processing timing is delayed with regard to the transmission timing, and the delay time fluctuates cyclically.

Figure 4:
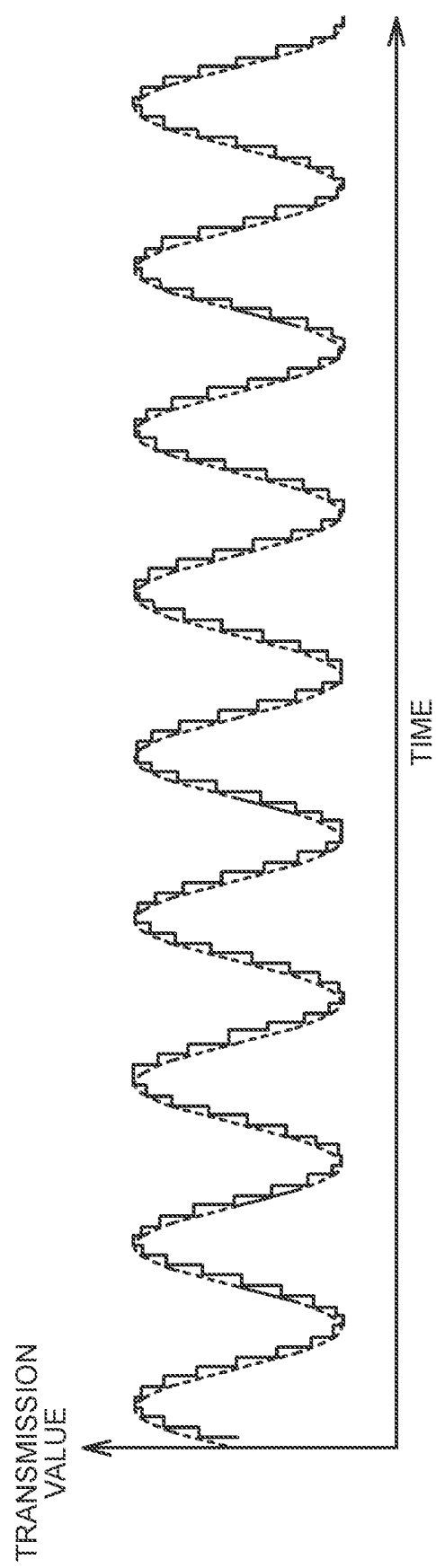
FIG. 4 is a diagram showing an example of change over time of measurement data values transmitted from an air flow meter provided in the gasoline engine.
Figure 5:
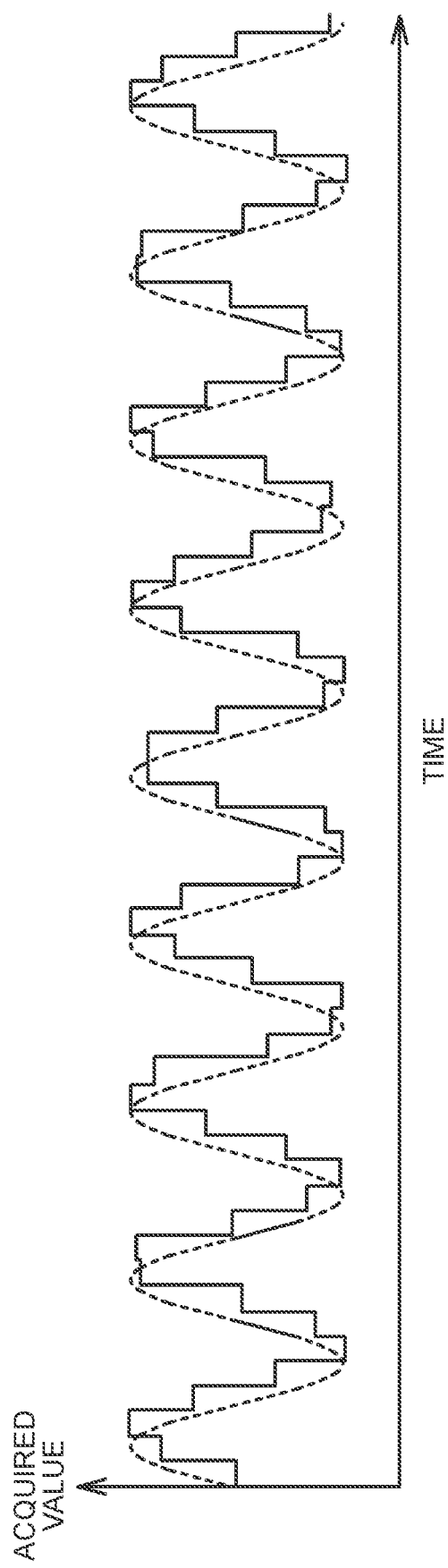
FIG. 5 is a diagram showing an example of change over time of measurement data values acquired by a storage unit according to the comparative example.

FIG. 4 is a diagram showing an example of change over time of the measurement data value (hereinafter referred to as "transmission value") that the air flow meter 15 transmits, and FIG. 5 is a diagram showing an example of change over time of the measurement data value acquired by the storage unit 61 according to the comparative example (hereinafter referred to as "acquired value"). In FIGS. 4 and 5, the dotted line represents the change over time of the actual value of the measurement object of the air flow meter 15 (hereinafter referred to as "measurement object value").

Further, in the engine 20, intake pulsation is generated in the intake pipe 10, due to reciprocating motion of the pistons 24 and opening/closing operations of the intake valves 42. Accordingly, the measurement object value is represented as a superposed waveform of a sine wave having a plurality of rotational orders in accordance with the intake pulsation. Note that in FIGS. 4 and 5, the measurement object value is schematically shown as a sine wave in a simplified manner. The air flow meter 15 measures the measurement object value for each transmission cycle, and accordingly the air flow meter 15 transmits a discretized transmission value of the measurement object value to the ECU 6.

Also, the storage unit 61 acquires the transmission value from the communication processing unit 60 at each acquisition cycle that is longer than the transmission cycle, and accordingly the acquired value is a value obtained by downsampling of transmission values. Accordingly, the waveform of the acquired value is markedly distorted from the waveform of the original measurement object value as compared with the transmission value. There is error in the acquired value acquired by the storage unit 61 as to the measurement object value, in accordance to this distortion. This error is dependent on the cyclic fluctuation of the delay time between the transmission timing and the processing timing of the measurement data, and the fluctuation in accordance to the cycle of the intake pulsation.

$$Gecu(t)=A_1 \sin \{2\pi f_1(t-\Sigma A_i \sin (2\pi f_i t))\} \quad (1)$$

The measurement data value Gecu (t) that the storage unit 61 acquires from the air flow meter 15 is approximatively represented by the above Expression (1), for example. In Expression (1), $A_1$ represents the amplitude of the measurement object value, and $f_1$ represents the frequency of the intake pulsation. Also, $A_i$ represents the amplitude of the delay time, and $f_i$ represents the frequency of fluctuation of the delay time (hereinafter, "delay time frequency").

From Expression (1), the error of the acquired value depends on the difference between the cyclic fluctuation of delay time and the frequency of intake pulsation. As a result, a swell phenomenon occurs, in which the numerical value obtained from the computation processing by the computation processing unit 62 fluctuates in short cycles.

Figure 6:
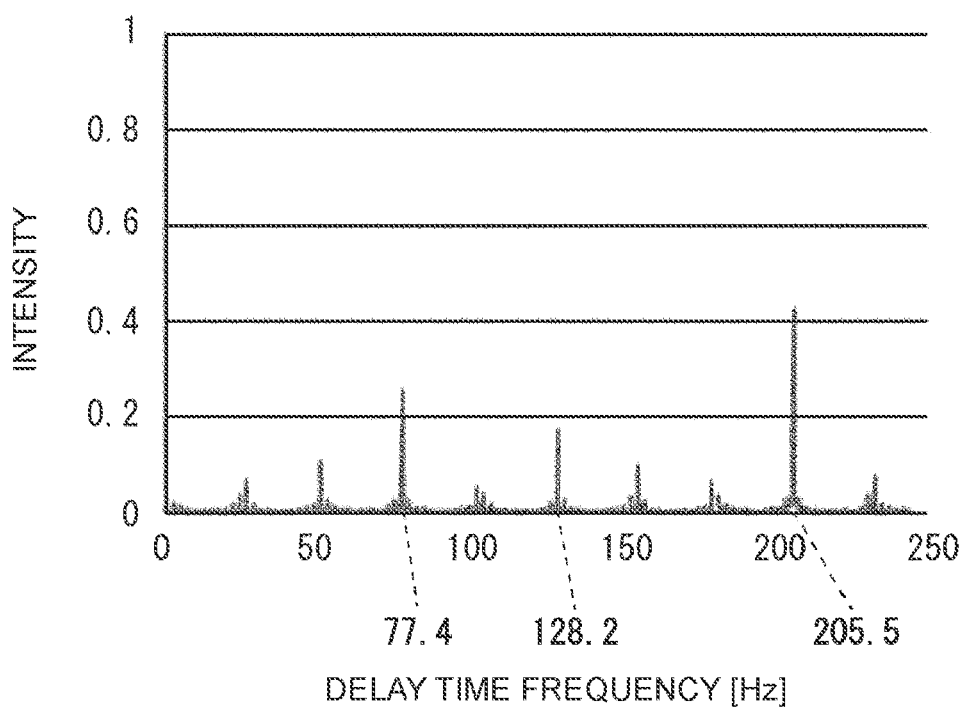
FIG. 6 is a spectrum diagram showing the intensity of delay time frequencies according to the comparative example.

FIG. 6 is a spectrum diagram showing the intensity of the delay time frequency ($f_1$) according to the comparative example. The intensity of the delay time frequency is obtained by fast Fourier transform of the delay time. In this example, the intensity is high in the proximity of the delay time frequencies of 77.4 Hz, 128.2 Hz, and 205.5 Hz. The effects of the swell phenomenon are great near frequencies with high intensity.

Figure 7:
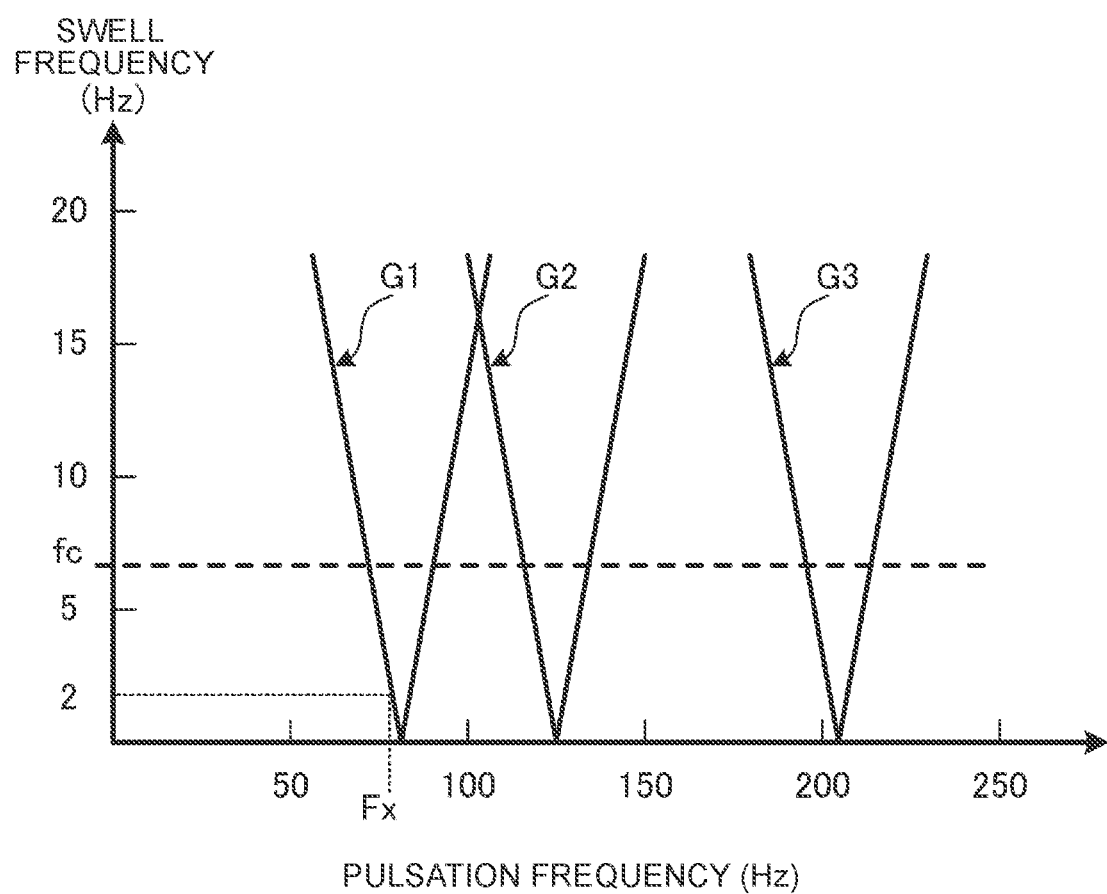
FIG. 7 is a diagram showing an example of change in the frequency of swells with respect to the frequency of intake pulsation according to the comparative example.

FIG. 7 is a diagram showing an example of change in the frequency of the swell (hereinafter referred to as "swell frequency") as to the frequency of intake pulsation (hereinafter referred to as "pulsation frequency"), according to the comparative example. In FIG. 7, the horizontal axis represents the pulsation frequency and the vertical axis represents the swell frequency.

Reference sign G1 indicates a swell frequency corresponding to a component of delay time frequency of 77.4 Hz, reference sign G2 indicates a swell frequency corresponding to a component of delay time frequency of 128.2 Hz, and reference numeral G3 indicates a swell frequency corresponding to a component of delay time frequency of 205.5 Hz.

The computation processing unit 62 performs computation processing after filtering processing of the measurement data using a low-pass filter. Accordingly, the high-order component of the swell frequency, higher than the cutoff frequency fc of the low-pass filter, is removed, and the component of the swell frequency lower than the cutoff frequency fc is a factor in a large error occurring in the computation processing. For example, when the revolutions of the engine 20 are 2000 rpm, the pulsation frequency Fx Hz corresponding to 2000 rpm generates a swell frequency of approximately 2 Hz, causing error to occur.

Figure 8:
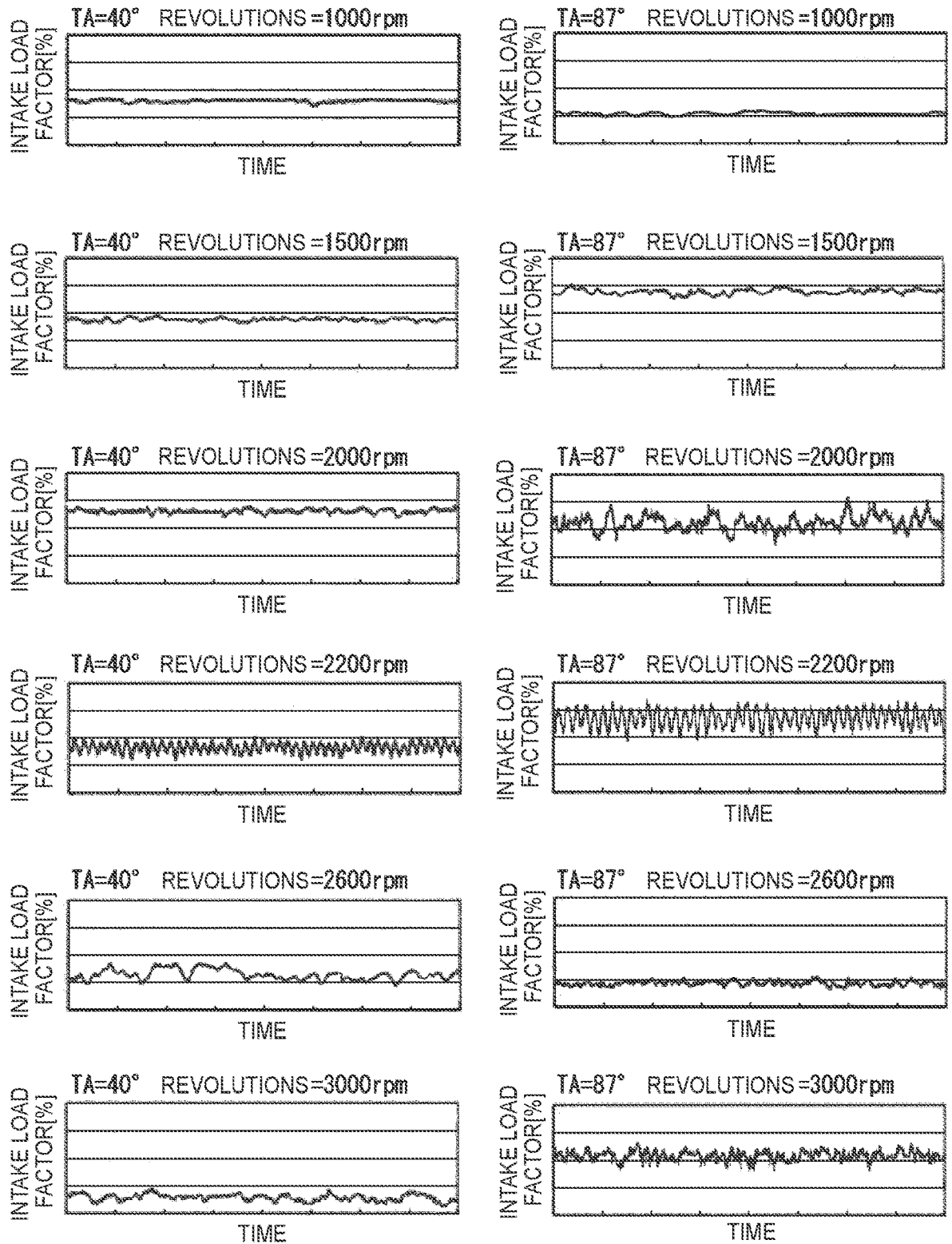
FIG. 8 is a diagram showing an example of a swell phenomenon due to change over time in intake load factor, at different revolutions and throttle valve opening degrees of the gasoline engine.

FIG. 8 is a diagram showing an example of the swell phenomenon. FIG. 8 shows the change over time of the intake load factor of the engine 20 (in terms of %), for each of revolutions 1000 to 3000 rpm and throttle valve opening degrees TA of 40° and 87°. When the revolutions of the engine 20 are 2000 rpm, a swell phenomenon occurs in which the intake load factor calculated by the computation processing unit fluctuates at approximately 2 Hz, but at other revolutions, the swell phenomenon does not occur.

Figure 9:
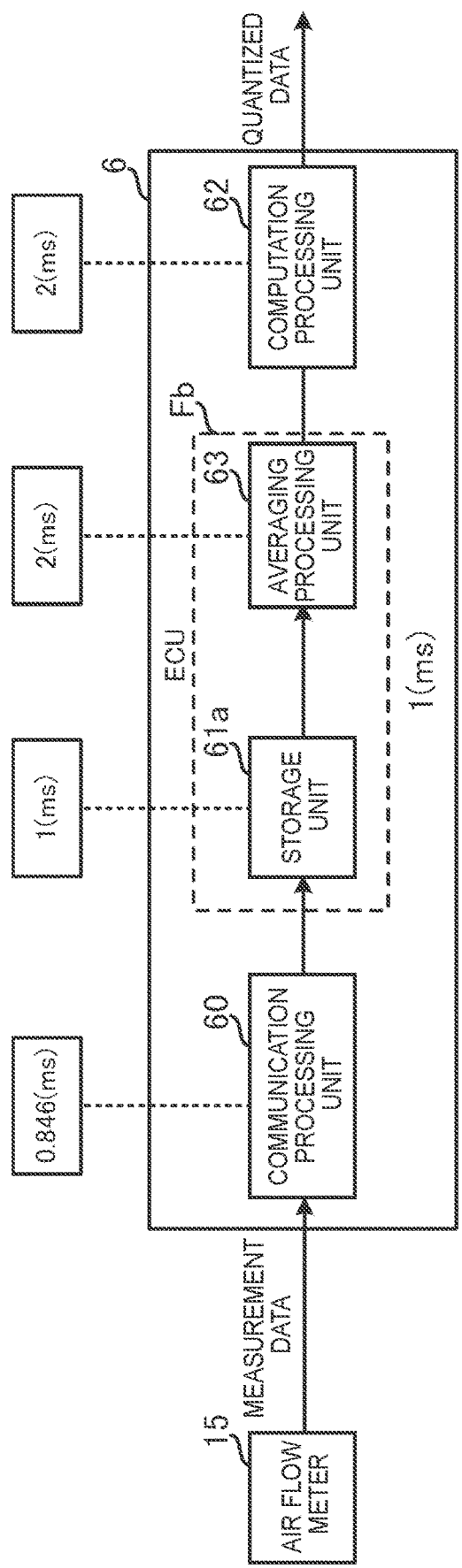
FIG. 9 is a diagram illustrating data processing of the ECU according to the embodiment.

Next, the data processing method according to the embodiment of the disclosure will be described. FIG. 9 is a diagram illustrating data processing of the ECU 6 according to the embodiment. In FIG. 9, configurations common to those in FIG. 2 are denoted by the same reference signs, and description thereof will be omitted. The ECU 6 forms the communication processing unit 60, a storage unit 61a, an averaging processing unit 63, and the computation processing unit 62 as functions, by the processor 70 reading and executing a program. Note that reference sign Fb denotes a portion that differs from the configuration of the comparative example illustrated in FIG. 2. The processing of this portion is faster than in the comparative example.

The storage unit 61a acquires and stores measurement data from the communication processing unit 60 in an acquisition cycle of 1 ms, which is shorter than that of the storage unit 61 according to the comparative example. At this time, the transmission cycle of the measurement data from the air flow meter 15 is 0.846 ms, in the same way as in the comparative example. Accordingly, the storage unit 61a can acquire the transmission value of the air flow meter 15 more frequently than in the comparative example. Note that the measurement data acquisition cycle by the storage unit 61a is an example of a third cycle.

The averaging processing unit 63 reads measurement data from the storage unit 61a, and performs averaging thereof at an averaging cycle of 2 ms, which is the same as the processing cycle of the computation processing unit 62. The averaging processing unit 63 calculates, for example, a running average value of measurement data.

$$Dm=(D[i]+D[i+1])/2 \quad (2)$$

For example, the averaging processing unit 63 calculates an average value Dm of a measurement data value D[i] read at point-in-time i and a measurement data value D[i+1] read at point-in-time i+1 according to the above Expression (2), at an averaging cycle. This averaging processing can be realized by simple processing of adding and bit-shifting of the measurement data values, and accordingly has almost no effect on the processing load of the ECU 6. Now, the aforementioned bit shifting is an operation of shifting a bit string to the right or left by a specified count. The averaging processing unit 63 outputs the average value to the computation processing unit 62.

The computation processing unit 62 performs computation processing of average values of the measurement data values in 2 ms, which is the same as in the comparative example, to generate the quantized data. Accordingly, the load of computation processing is the same as the load in the comparative example.

Figure 10:
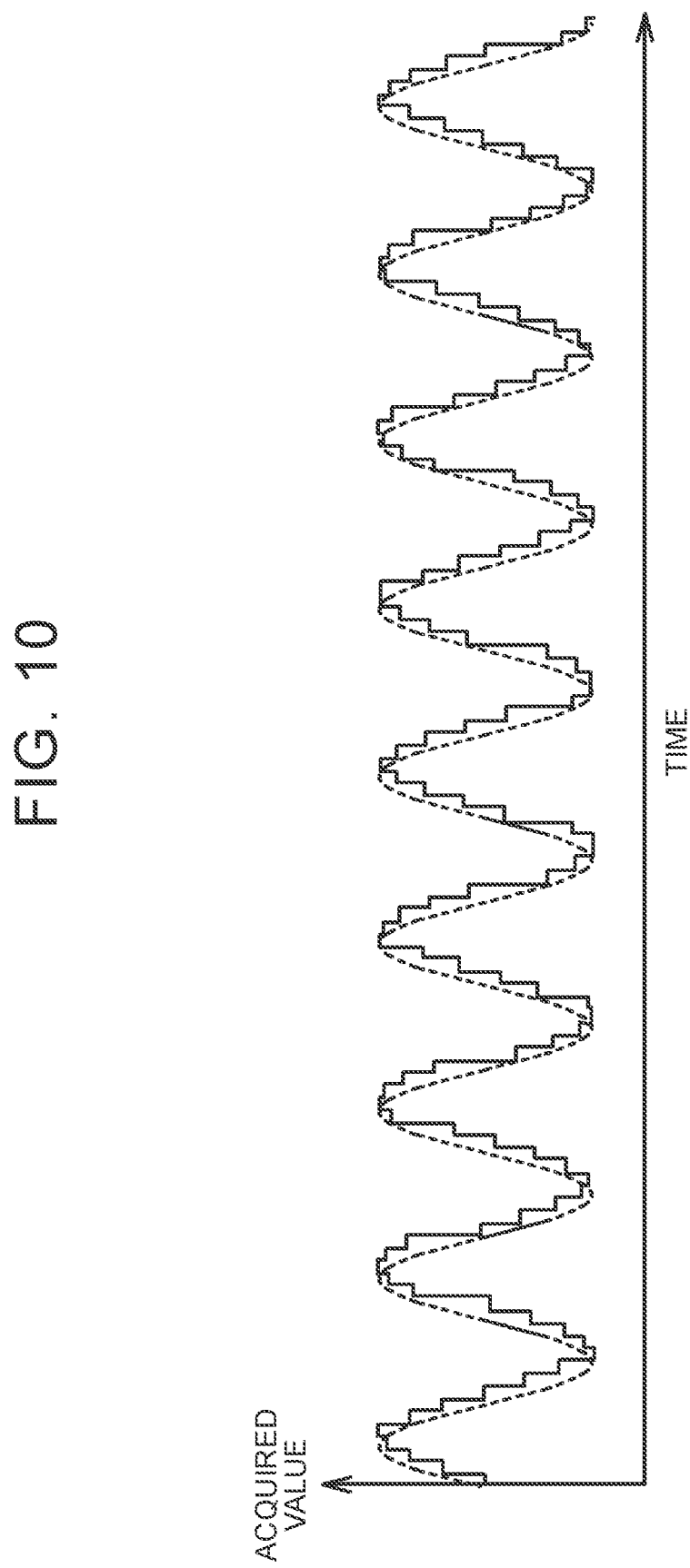
FIG. 10 is a diagram showing an example of change over time of measurement data values (acquired values) acquired by a storage unit according to the embodiment.

FIG. 10 is a diagram showing an example of change over time of the measurement data value acquired by the storage unit 61a (acquired value) according to the embodiment. In FIG. 10, the dotted line indicates the change over time of the measurement object value of the air flow meter 15.

As can be understood by comparison with FIG. 5, the waveform of the acquired value according to the embodiment has less deviation from the waveform of the measurement object value than the waveform of the acquired value according to the comparative example, and the precision is high. The averaging processing unit 63 averages the acquired values in the same averaging cycle as the processing cycle of the computation processing, and accordingly the load of the computation processing can be suppressed and precision can be improved.

Figure 11:
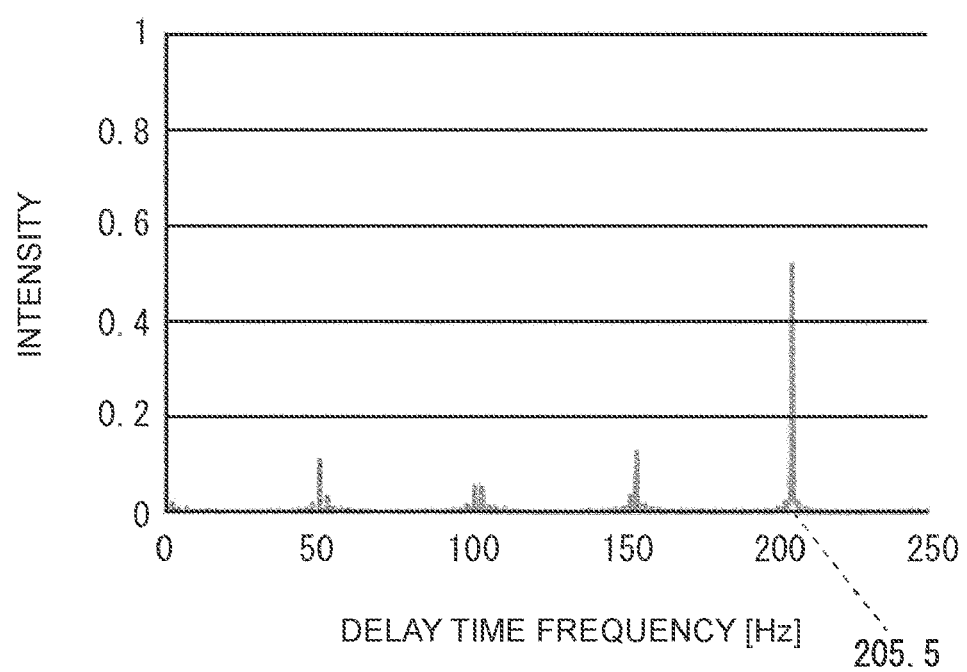
FIG. 11 is a spectrum diagram showing the intensity of delay time frequencies according to the embodiment.

FIG. 11 is a spectrum diagram showing the intensity of the delay time frequency ($f_1$) according to the embodiment. In this example, the intensity of the components of the low delay time frequencies of 77.4 Hz and 128.2 Hz is reduced, as compared to FIG. 7. Further, the intensity is higher than that of the comparative example in the vicinity of 205.5 Hz. The reason thereof is, as described with reference to FIG. 10, as a result of the waveform of the acquired value and the waveform of the transmission value approaching each other, the delay time is reduced, and the component of the delay time frequency that causes the swell phenomenon shifts to the high frequency band side.

Figure 12:
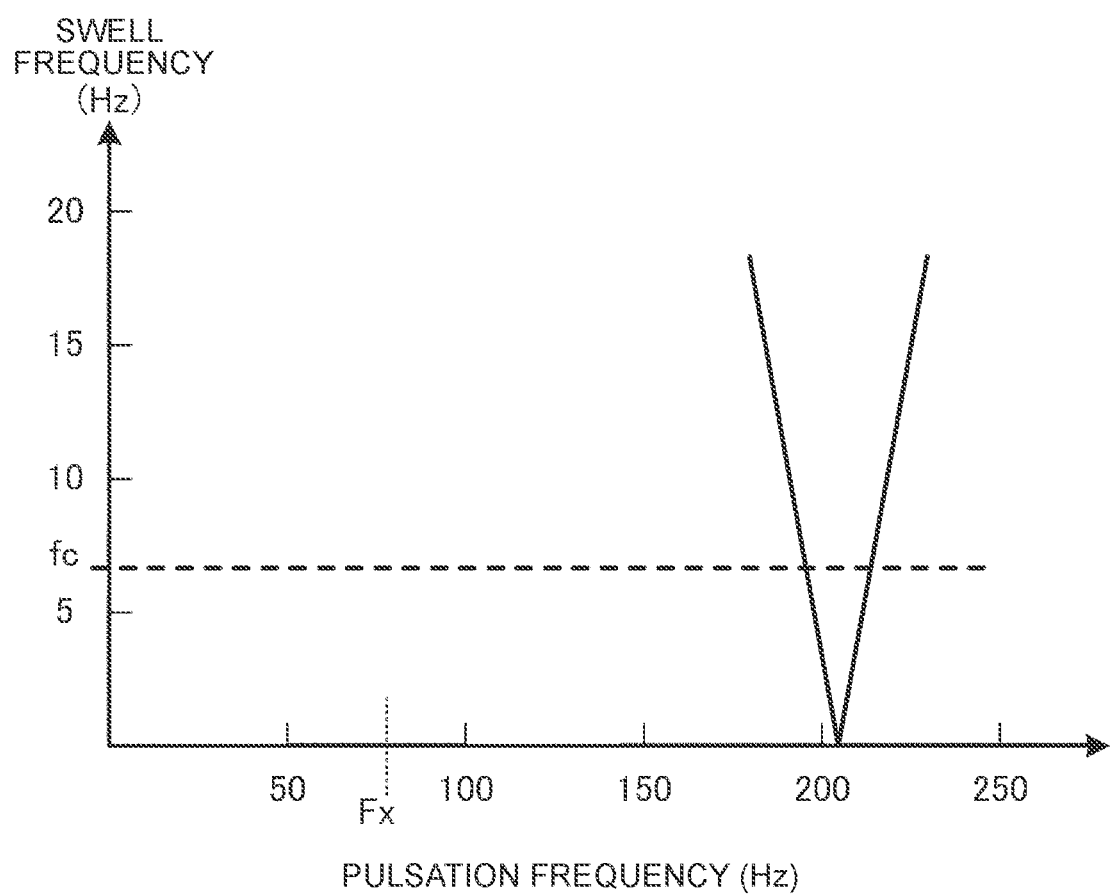
FIG. 12 is a diagram showing an example of change in the frequency of swells with respect to the pulsation frequency according to the embodiment.

FIG. 12 is a diagram showing an example of change in the frequency of swells as to the pulsation frequency according to the embodiment. In FIG. 12, the horizontal axis represents the pulsation frequency and the vertical axis represents the swell frequency.

Decrease in the delay time leads to decrease in the intensity of the delay time frequency components of 77.4 Hz and 128.2 Hz, and accordingly only the delay time frequency component of 205.5 Hz causes the swell phenomenon in the computation processing. A high pulsation frequency such as 205.5 Hz occurs when the revolutions of the engine 20 are high, i.e., the intake flow speed is high, and accordingly the air flow meter 15 substantially is not capable of following the intake pulsation in such a case. Accordingly, even when the swell phenomenon occurs in a pseudo manner, effects on the computation processing can be suppressed to a negligible level.

However, at a low pulsation frequency Fx Hz corresponding to the engine 20 running at revolutions of 2000 rpm, for example, the swell phenomenon does not occur. This is due to the component of the delay time frequency that causes the swell phenomenon shifting to the high frequency band side, as described above. In this way, pulsation frequencies corresponding to practical revolutions of the engine 20 do not cause the swell phenomenon.

As described above, the ECU 6 executes a data processing method for performing computation processing of measurement data regarding the intake air volume of the engine 20, transmitted from the air flow meter 15 at a predetermined transmission cycle, in a processing cycle that is longer than the transmission cycle. The ECU 6 acquires the measurement data in an acquisition cycle that is longer than the transmission cycle and shorter than the processing cycle, calculates the average value of the acquired measurement data in the same averaging cycle as the processing cycle, and performs computation processing thereof.

According to the above configuration, the ECU 6 performs computation processing on the measurement data acquired from the air flow meter 15 in a processing cycle that is longer than the transmission cycle, and accordingly the load of computation processing is suppressed. Also, the ECU 6 acquires the measurement data in an acquisition cycle longer than the transmission cycle and shorter than the processing cycle, calculates the average value of the acquired measurement data in the same averaging cycle as the processing cycle, and performs computation processing thereof, and accordingly the delay time can be reduced in comparison with the comparative example by the measurement data transmission cycle and the acquisition cycle approaching each other. Thus, the component of the delay time frequency that causes the swell phenomenon shifts to the high frequency band side, and accordingly the precision of the computation processing is improved in comparison with the comparative example.

According to the data processing method of this example, precision of computation processing can be improved while suppressing the load of computation processing of measurement data. In this example, measurement data regarding the intake air volume of the internal combustion engine is exemplified, but the operating state of the internal combustion engine can also be improved by executing the above processing with regard to measurement data indicating other operating states.

The embodiment described above is an example of a preferred embodiment of the disclosure. Note however, that the disclosure is not limited to this, and various modifications can be carried out without departing from the essence of the disclosure.

What is claimed is:

1. A data processing method comprising:
   receiving and holding variable measurement data transmitted from a sensor of an internal combustion engine at a first cycle;
   acquiring the held measurement data at a third cycle that is longer than the first cycle and shorter than a second cycle that is longer than the first cycle;
   calculating an average value of the measurement data at the second cycle;
   performing computation processing of the average value; and
   controlling the internal combustion engine based upon a result of the computation processing of the average value.

2. The data processing method according to claim 1, wherein the average value of the measurement data is obtained by adding and bit-shifting of the measurement data.

3. The data processing method according to claim 1, wherein the measurement data indicates an operating state of the internal combustion engine.

4. The data processing method according to claim 3, wherein the measurement data is a data regarding an intake air volume of the internal combustion engine.

5. The data processing method according to claim 1, wherein the internal combustion engine includes a spark plug, a throttle valve, and a fuel injection valve, and controlling the internal combustion engine includes controlling at least one of the spark plug, the throttle valve, and the fuel injection valve based upon the result of the computation processing of the average value.

6. The data processing method according to claim 1, wherein the computation processing of the average value is performed at the second cycle.

7. The data processing method according to claim 1, wherein each of the first cycle, the second cycle, and the third cycle is a single occurrence per quantity of time.

8. The data processing method according to claim 1, wherein each of the first cycle, the second cycle, and the third cycle is a single occurrence per quantity of milliseconds.

9. The data processing method according to claim 1, wherein each of the first cycle, the second cycle, and the third cycle are consistent over time.

10. The system according to claim 1, wherein the computation processing includes quantization of the average value.

11. The system according to claim 1, wherein the computation processing includes averaging the average value for each stroke of the internal combustion engine.

12. A system comprising:
an internal combustion engine including a sensor, wherein the sensor is configured to transmit variable measurement data at a first cycle; and
circuitry configured to:
receive and hold the measurement data transmitted from the sensor at the first cycle,
acquire the held measurement data at a third cycle that is longer than the first cycle and shorter than a second cycle that is longer than the first cycle,
calculate an average value of the measurement data at the second cycle,
perform computation processing of the average value, and
control the internal combustion engine based upon a result of the computation processing of the average value.

13. The system according to claim 12, wherein the average value of the measurement data is obtained by adding and bit-shifting of the measurement data.

14. The system according to claim 12, wherein the measurement data indicates an operating state of the internal combustion engine.

15. The system according to claim 14, wherein the measurement data is a data regarding an intake air volume of the internal combustion engine.

16. The system according to claim 12, wherein
the internal combustion engine includes a spark plug, a throttle valve, and a fuel injection valve, and
the circuitry is configured to control at least one of the spark plug, the throttle valve, and the fuel injection valve based upon the result of the computation processing of the average value.

17. The system according to claim 12, wherein the circuitry is configured to perform the computation processing of the average value at the second cycle.

18. The system according to claim 12, wherein each of the first cycle, the second cycle, and the third cycle is a single occurrence per quantity of time.

19. The system according to claim 12, wherein each of the first cycle, the second cycle, and the third cycle is a single occurrence per quantity of milliseconds.

20. The system according to claim 12, wherein each of the first cycle, the second cycle, and the third cycle are consistent over time.

* * * * *